(12) United States Patent
Xu et al.

(10) Patent No.: US 6,816,451 B2
(45) Date of Patent: Nov. 9, 2004

(54) RECOVERING RECORDED INFORMATION FROM AN OPTICAL DISK

(75) Inventors: Jin Xu, Singapore (SG); Kai Meng Hock, Singapore (SG)

(73) Assignee: Sony Corporation, Tokyo (JP)

( * ) Notice: Subject to any disclaimer, the term of this patent is extended or adjusted under 35 U.S.C. 154(b) by 373 days.

(21) Appl. No.: 10/139,535

(22) Filed: May 6, 2002

(65) Prior Publication Data

US 2002/0167889 A1 Nov. 14, 2002

(30) Foreign Application Priority Data

May 8, 2001 (SG) .......................................... 200102680

(51) Int. Cl.$^7$ ................................................ G11B 7/00
(52) U.S. Cl. ...................................................... 369/126
(58) Field of Search ............................... 369/275.3, 126

(56) References Cited

U.S. PATENT DOCUMENTS 5,705,247 A * 1/1998 Arai et al. .................. 428/64.1

FOREIGN PATENT DOCUMENTS

| WO | WO 99 59142 | 11/1999 |
| WO | WO 00 48177 | 8/2000 |
| WO | WO 00 48178 | 8/2000 |

OTHER PUBLICATIONS

Donald A. Chernoff, et al.: "AFM Length Analysis of Data Marks: Measuring Jitter, Asymmetry, Process Noise and Process Position," Proceedings–Spie The International Society For Optical Engineering, 2002, vol. 4342, pp. 515–523.
Y. J. Huh, et al.: "Thermal Decomposition and Deformation of Dye and Polycarbonate in Compact Disc–Recordables," Japan Journal of Applied Physics, vol. 36, pp. 7233–7238, Dec. 1997.

* cited by examiner

Primary Examiner—Nabil Hindi
(74) Attorney, Agent, or Firm—Frommer Lawrence & Haug LLP; William S. Frommer

(57) ABSTRACT

Data is recovered from a write-once optical disk having data written on it. The disk is composed of a substrate and a dye layer. The data was originally written to the dye layer as patterns of pits and lands, but the dye layer is subject to corruption due to ageing so that the data cannot be read by a conventional read process. The data is recovered by exposing the surface of the substrate, measuring deformations to that layer caused by the write process, and extracting the data from the measured deformations by classifying the measured deformations into deformations typical of predetermined patterns of pits and lands.

14 Claims, 4 Drawing Sheets

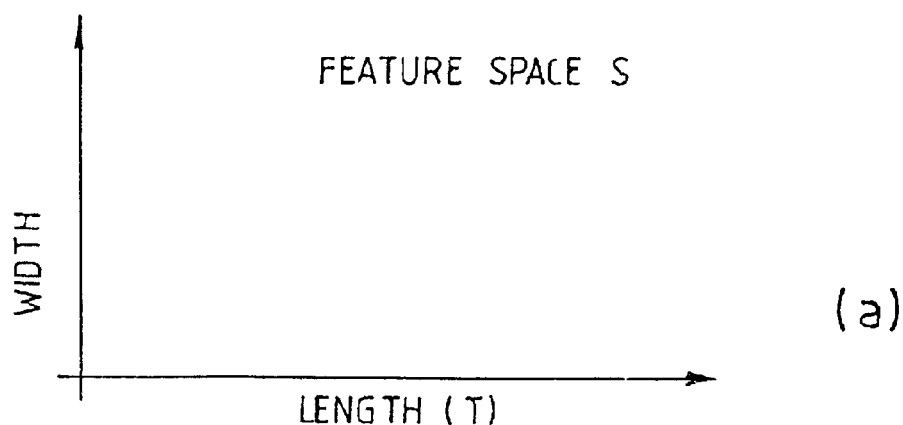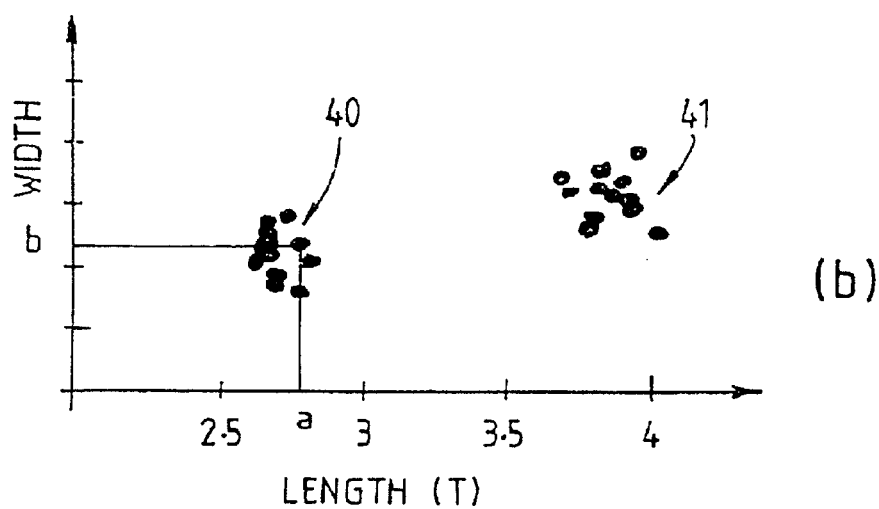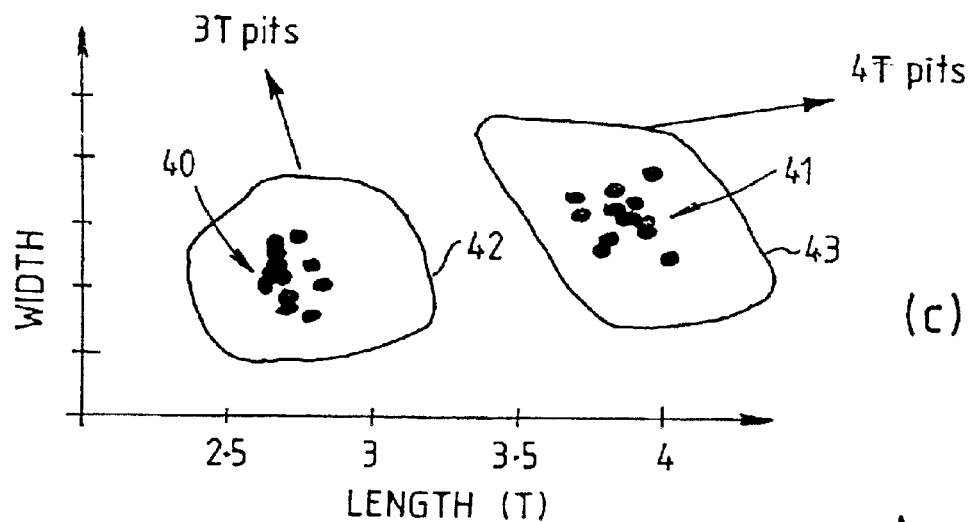
FIG. 4.

RECOVERING RECORDED INFORMATION FROM AN OPTICAL DISK

FIELD OF THE INVENTION

The present invention relates to a method for reading recorded information from an optical disk, particularly a write-once optical disk which is subject to corruption due to ageing. It relates also to apparatus for performing the method.

BACKGROUND OF THE INVENTION

Optical write-once discs, such as CD-R and DVD-R disks, are widely used for data storage. Such a disk presently has a cross-sectional structure as shown in FIG. 1. It is produced from a disk-shaped plastic substrate 3 which was formed with a "pre-groove" 5 extending in a spiral across its recording face (the upper one in FIG. 1). Subsequently, a layer 7 of dye is formed overlying the recording face, a reflective layer 8 (such as aluminium) is formed on the dye lyaer 7, and a protective layer 9 is formed on the reflective layer 8. The cross-section of the disk at this stage is as illustrated on the left of FIG. 1.

Data is written to the disk using a first laser beam ("write laser") which illuminates the disk from below as viewed in FIG. 1, at selected locations. At portions of the pre-groove, such as that illustrated generally as 10, which have been illuminated by the write laser, the write laser alters the dye layer as shown in area 12, changing its reflective index. A subsidiary effect of the writing process is that the pre-groove is deformed, indicated schematically in FIG. 1 as configuration 11.

Portions of the pre-groove which were not exposed to the write laser (such as the area shown on the left of the figure) are referred to as "lands". Portions which have been exposed to the write laser, such as portions 10, are called "pits". Due to the change in the reflective index of the dye as between a pit and a land, a second laser beam ("read laser") incident on the disk (again from below as shown in FIG. 1) is reflected with a difference in optical path distance between a "pit" and a "land". This difference makes it possible to detect the recorded information by an optical pickup.

A typical conventional write-read process is illustrated in FIG. 2(a). In step 21 digital data is input to a signal processing unit. In step 22 it is converted to a known standard ("EFM" or "eight-fourteen modulation"). In step 23, recording software uses the result to generate a pulse stream for switching the write laser on and off as the write laser scans along the pre-groove 5. Thus data is written to the write-once optical disk.

In a conventional read process, illustrated in FIG. 2(b), a read laser (which is of lower power than the write laser) scans the disk along the pre-groove, measuring the degree of reflection of the laser from the surface (step 26). The data is converted out of the EFM standard (step 27). Thus the digital data written on the disk is extracted (step 28).

Due to the inherent instability of the organic dye layer to light, the dye will decay over a period of years. When the dye decays, the recorded pattern within the dye can no longer be recovered by the read process of FIG. 2(b), leading to a potential loss of data. To address this problem, some researchers are trying to develop new organic dye layers which have a longer life.

SUMMARY OF THE INVENTION

In general terms, the present invention proposes that a write-once optical disk having data written on it, and subject to corruption so that the data cannot be read by a conventional read process, is read by removing the dye layer (and other layers thereon) to expose the surface of the substrate, measuring deformations to that layer caused by the write process, and extracting the data from the measured deformations.

Specifically the invention proposes a method for retrieving recorded information from an optical write-once disk comprising a substrate and a dye layer overlying a recording surface of the substrate, digital data encoded by a recording standard having been recorded on the disk by an optical write process, the method comprising the steps of:

removing the dye layer from the recording surface of the substrate to expose the recording surface;

measuring the topography of deformations of the recording surface to extract numerical parameters of sections of the disk;

using the extracted numerical parameters and the recording standard to classify the sections of the recording surface; and extracting the digital data from the classification of the sections.

The disk is generally of the known type described above in which the data is recorded sequentially along a spiral pre-groove extending around the axis of the disk and from a radially inward position to a radially outward position. The sections are then sections of the pre-groove, and the measurement of the topography is a measurement carried out along the entire length of the pre-groove. In particular, the numerical parameters characterise deformations of the pre-groove caused by the write process.

Furthermore, the digital data is preferably written on the disk as a series of pits and lands of predetermined types associated with the recording standard (e.g. EMF). The classification includes classifying sections of the optical disk corresponding to one of these types of pit or land.

The extracted numerical parameters preferably include at least the lengths of lands and of the deformations corresponding to pits. They may further include the widths of deformations corresponding to pits, and/or any other numerical parameters of the topography associated with pits.

Suppose that the classification process employs a certain number (at least one, but not necessarily all) of the numerical parameters extracted from the topography. The classification can then be considered as being based on a plurality of regions defined in that space and corresponding respectively to the predetermined patterns. Each section of the pre-groove is classified by determining which of the regions the parameters extracted for that section of the pre-groove falls into. The process of selecting the classification process thus corresponds to selecting which of the extracted parameters to employ in constructing the parameter space, and where the borders of the regions should be located in that space. The second of these processes may be performed by observing how extracted numerical parameters are clustered in the space. The regions should be selected such that each corresponds to a cluster. Preferably, this process is performed automatically.

For example, the classification process may be performed using a neural network as a classification tool. The parameters of the neural network may be tuned according to known algorithms to set the borders of the regions in the parameter space.

It is possible to test the classification process to determine the accuracy of the classification process. For example, the accuracy of the classification process is related to the degree to which the regions are well separated. If it is found that a high proportion of the deformation patterns are close to two regions, then the accuracy of the classification process will be low, and the classification process may be modified. For example, the definition of the regions in the parameter space may be changed. Alternatively, a different parameter space may be employed, i.e. with different one(s) of the extracted parameters and/or a greater number of the extracted parameters.

The measurement of the topography of the recording surface may be performed by atomic force microscopy.

As mentioned above, a known disk typically comprises one or more further layers, i.e. reflective layer(s) and protective layer(s), covering the dye layer and thus overlying the recording surface of the substrate. In the case of such a disk, the removal of the dye layer further includes removing the further layers.

Furthermore, the invention proposes an apparatus for carrying out the method according to the invention. Specifically, the invention proposes an apparatus for retrieving recorded information from an optical write-once disk comprising a substrate and a dye layer overlying a recording surface of the substrate, digital data encoded by a recording standard having been recorded on the disk by an optical write process, the apparatus comprising:

means for removing the dye layer from the recording surface of the substrate to expose the recording surface;

a microscope unit for measuring the topography of deformations of the recording surface to extract numerical properties of sections of the recording surface;

a classification unit for using the numerical parameters and the recording standard to classify the sections of the recording surface; and a signal processing unit for extracting the digital data from the classification of the sections.

BRIEF DESCRIPTION OF THE FIGURES

An embodiment of the invention will now be described for the sake of example only, with reference to the following figures in which:

FIG. 4 shows illustrates the concept of clustering in parameter space which is used in the classification step of the process of FIG. 3.

DETAILED DESCRIPTION OF EMBODIMENTS

Figure 1:
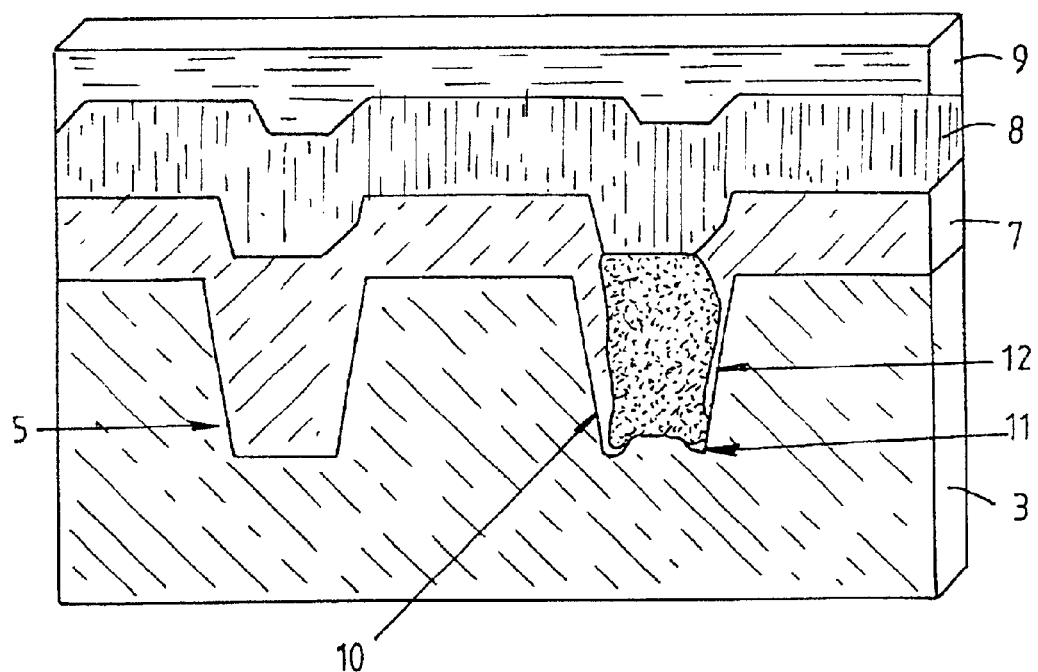
FIG. 1 shows the construction of a known write-once optical disk.
Figure 2:
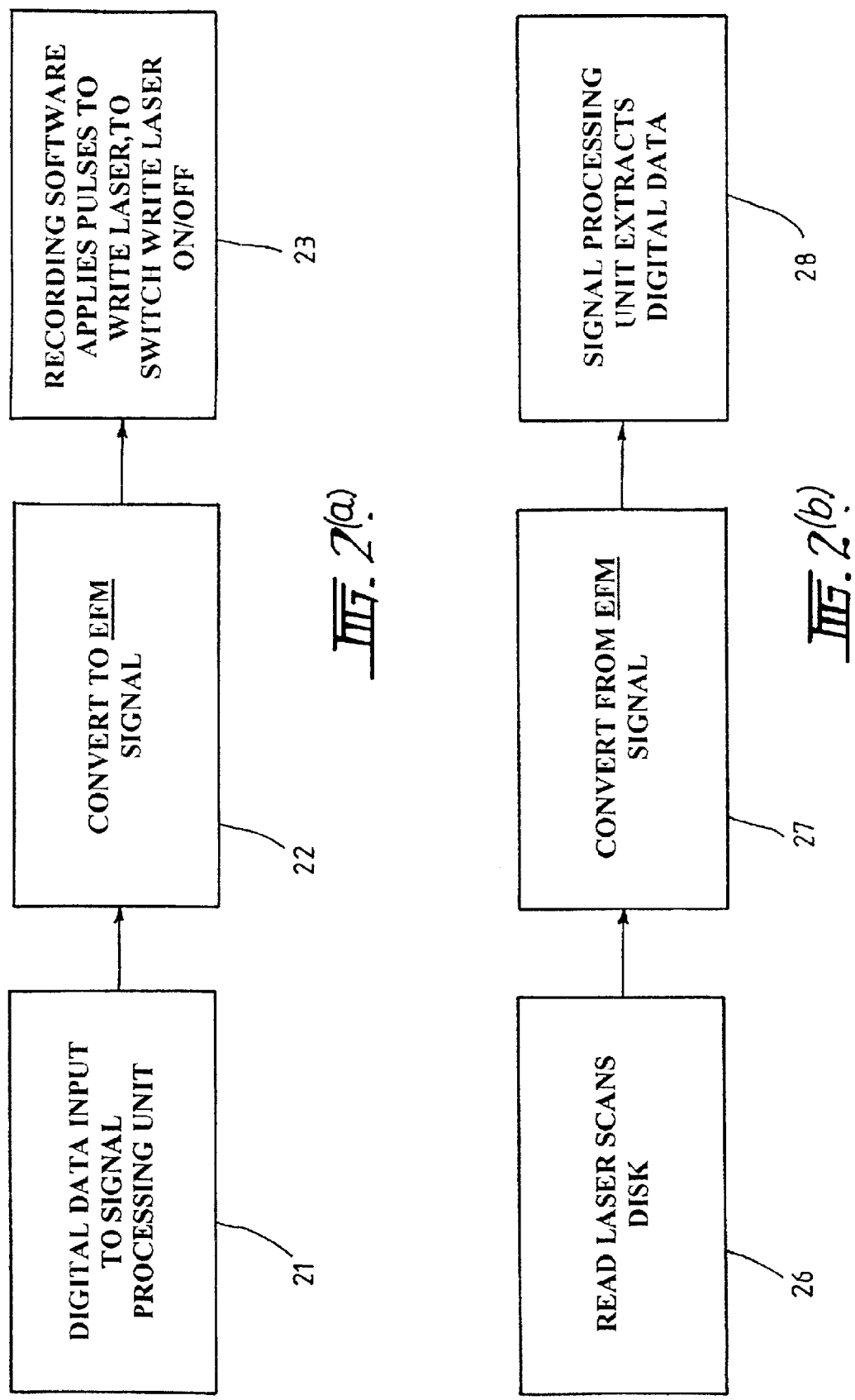
FIG. 2, which is composed of FIG. 2(a) and FIG. 2(b), illustrates the steps of known read and write processes.
Figure 3:
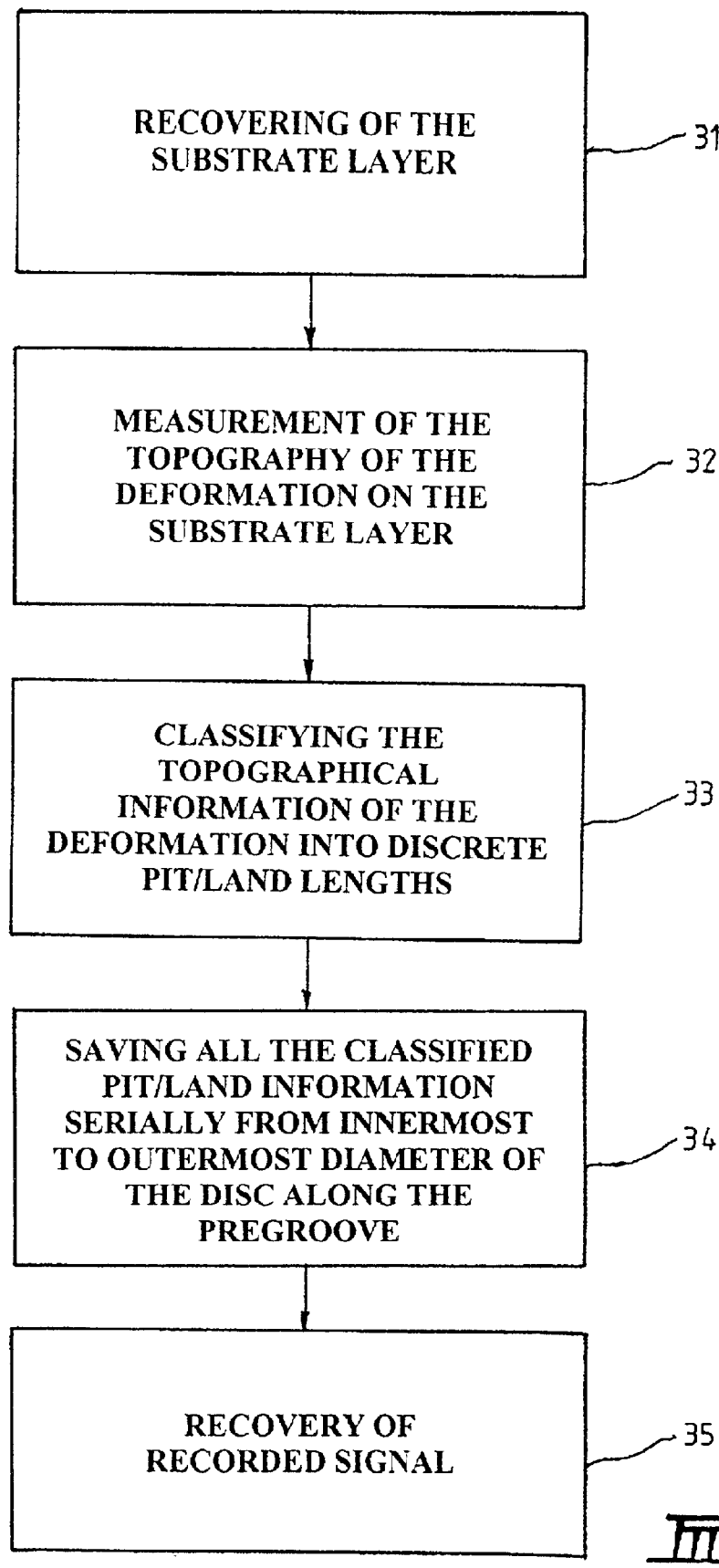
FIG. 3 illustrates the steps of a read process according to the present invention.

Turning to FIG. 3, the embodiment of the invention comprises the following steps.

Step 31 is to recover the recording surface of the substrate layer by separating it from the protective layer and reflective layer, and cleaning away the dye layer. Care is taken to attempt to cause no damage to the deformations of the recording surface, and the recording surface is cleaned for measurement. Specifically, the protective/reflective layers can be removed by applying a transparent adhesive tape, and the dye layer may be removed by ethanol or IPA (isopropyl alcohol).

Step 32 is to measure topographical information of all deformation on the substrate layer. This can be done by use of equipment such as an AFM (Atomic Force Microscopy).

Step 33 is to classify the topography information into discrete pit/land length (e.g. 3T to 11T for EFM signal) information. For example, if the data is encoded in the EFM standard, then we know that the pits will have length which is an integer number of "bits", between 3 bits (referred to as "3T") and 11 bits (referred to as "11T").

This transformation is possible for any recording standard because there is a high dependence of the deformation shape on the original recorded signal and the original signal is discrete (thus separable). All the deformations ("pits"), and the spaces ("land") between deformations, can be classified into predefined classes (e.g. in the case that the data is encoded with EFM, the pits and lands can be classified into 3T, 4T . . . 11T pits and lands) by the following steps:

1) Select a set of parameters (e.g. length and depth) of the deformation topographies as the features to form a feature space S; and select a set of parameters (e.g. length) of the spaces ("land") between the deformations to form another feature space S'. The two-dimensional feature space S is shown in FIG. 4(a).

2) Formulate all the collected deformation ("pit") topologies in the feature space S and the space between the deformations ("land") in feature space S' respectively. The data will aggregate to form disjoint distributions in respective spaces. This is illustrated in FIG. 4(b), where each of the pits is marked as a dot, and the arrow 40 indicates a cluster of dots corresponding to a length a and width b. The arrow 41 indicates a second cluster of dots.

3) Use a known classification method (e.g. a neural network with a known learning algorithm) to classify all the disjoint distributions into pre-defined classes (e.g. 3T to 11T pits in space S, and 3T to 11T lands in space S') in respective spaces. This is illustrated in FIG. 4(c), where regions 42, 43 are constructed enclosing clusters 40, 41 respectively. It is determined that these clusters correspond to pit patterns 3T and 4T respectively.

Step 34 of the embodiment is to save all the pit/land information along the pre-groove from the innermost diameter to the outermost diameter sequentially (in the same sequence in which data was recorded). The result is a continuous train of the predefined pit and land types, such as "3T pit/4T land/11T pit/10T land . . . ".

Step 35 is to recover recorded binary data by a pre-known decoding method (e.g. EFM decoding which is well-known) from the saved pit/land information saved in step 34. This data can be sent to the signal processing unit in a playback system to complete the playback.

Although the invention has been described above in relation to a single embodiment, many variations are possible within the scope of the invention as will be clear to a skilled person.

What is claimed is:

1. A method for retrieving recorded information from an optical write-once disk comprising a substrate and a dye layer overlying a recording surface of the substrate, digital data encoded by a recording standard having been recorded on the disk by an optical write process, the method comprising the steps of:

removing the dye layer from the recording surface of the substrate to expose the recording surface;

measuring the topography of deformations of the recording surface to extract one or more numerical properties of sections of the recording surface;

using the extracted numerical parameters and the recording standard to classify the sections of the recording surface; and extracting the digital data from the classification of the sections.

2. A method according to claim 1 in which the data is recorded sequentially along a spiral pre-groove extending around the axis of the disk and from a radially inward position to a radially outward position, the measurement of the topography including a measurement of the deformation of the pre-groove caused by the write process along the entire length of the groove and the sections being sections of the pre-groove.

3. A method according to claim 2 in which the digital data is written on the disk as consecutive selections from a set of types of pits and lands defined by the recording standard, the classification including classifying the sections of the recording surface as these predetermined types of pits and lands.

4. A method according to claim 3 in which the recording standard is EFM.

5. A method according to claim 3 or claim 4 in which the extracted numerical parameters include the lengths of sections of the recording surface corresponding to pits and lands.

6. A method according to claim 3, claim 4 or claim 5 in which the extracted numerical parameters include the widths of deformation in sections of the recording surface corresponding to pits.

7. A method according to any preceding claim in which the classification is performed by a classification process selected based on a clustering of the numerical parameters in a space defined by one or more of the numerical parameters.

8. A method according to claim 7 in which the classification is selected by an automatic process.

9. A method according to any preceding claim in which the classification is performed using a neural network.

10. A method according to any preceding claim in which the measurement of the topography of the recording surface is performed by atomic force microscopy.

11. A method according to any preceding claim in which the disk further comprises one or more further layers overlying the recording surface of the substrate, each of the further layers being a reflective layer or a protective layer, the removal step further including removing the further layers.

12. An apparatus for retrieving recorded information from an optical write-once disk comprising a substrate and a dye layer overlying a recording surface of the substrate, digital data encoded by a recording standard having been recorded on the disk by an optical write process, the apparatus comprising:

means for removing the dye layer from the recording surface of the substrate to expose the recording surface;

a microscope unit for measuring the topography of deformations of the recording surface to extract one or more numerical properties of sections of the recording surface;

a classification unit for using the extracted numerical parameters and the recording standard to classify the sections of the recording surface; and a signal processing unit for extracting the digital data from the classification of the sections.

13. An apparatus according to claim 12 in which the microscope unit comprises an atomic force microscope.

14. An apparatus according to claim 12 or claim 13 in which the classification unit comprises a neural network.

* * * * *